United States Patent [19]
Kirsch et al.

[11] Patent Number: 5,235,461
[45] Date of Patent: Aug. 10, 1993

[54] OPTICAL ENCODING AND CORRELATION SYSTEM

[75] Inventors: James C. Kirsch, Meridianville; Don A. Gregory, Huntsville, both of Ala.

[73] Assignee: The United States of America as represented by the Secretary of the Army, Washington, D.C.

[21] Appl. No.: 860,379

[22] Filed: Mar. 30, 1992

[51] Int. Cl.$^5$ .............................................. G02B 5/18
[52] U.S. Cl. ..................... 359/561; 359/559; 364/822; 382/31; 382/42
[58] Field of Search ................ 359/559, 560, 561; 364/822; 382/31, 42

[56] References Cited

U.S. PATENT DOCUMENTS

| | | | |
|---|---|---|---|
| 4,695,973 | 9/1987 | Yu | 359/561 |
| 4,826,285 | 5/1989 | Horner | 359/561 |
| 4,925,296 | 5/1990 | Reichmuth | 364/822 |
| 5,024,508 | 6/1991 | Horner | 359/561 |
| 5,107,351 | 4/1992 | Leib et al. | 359/561 |

Primary Examiner—Bruce Y. Arnold
Assistant Examiner—J. P. Ryan
Attorney, Agent, or Firm—Freddie M. Bush; Howard G. Garner

[57] ABSTRACT

An optical correlator system for encoding a complex optical image onto a coherent beam of light such as a laser and comparing it with a reference complex image. One embodiment of the invention encodes phase only information of the complex image onto the coherent beam of light by means of a liquid crystal television receiver. The light beam is passed through the liquid crystal television receiver, whose pixels are manipulated to provide phase information concerning the image. A second embodiment of the invention encodes both phase and amplitude components of a complex image onto the coherent beam of light such as a laser beam. Either or both encodings are utilized in the optical correlator system.

6 Claims, 9 Drawing Sheets

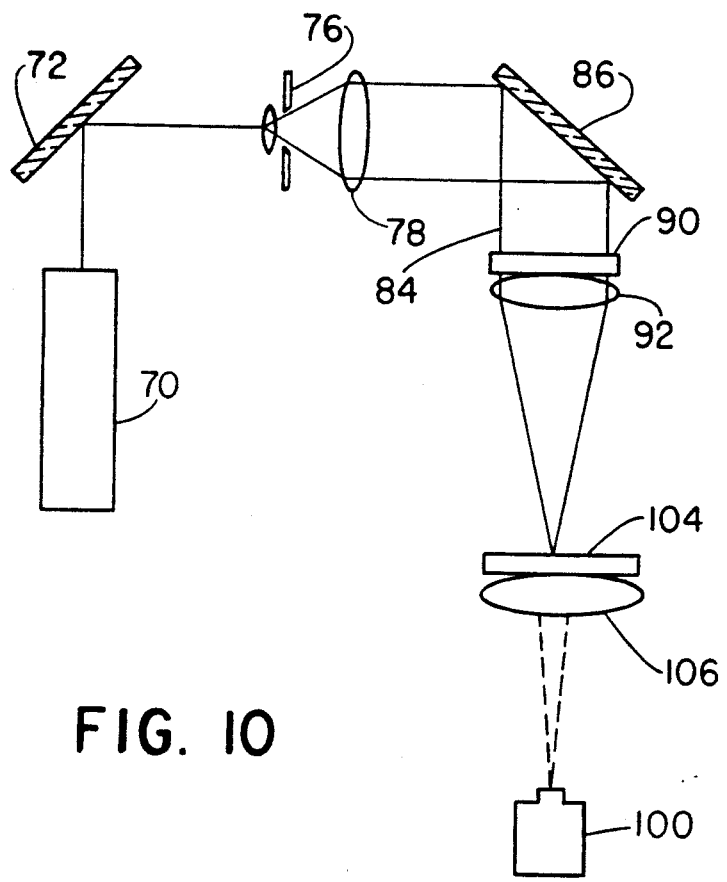
FIG. 10
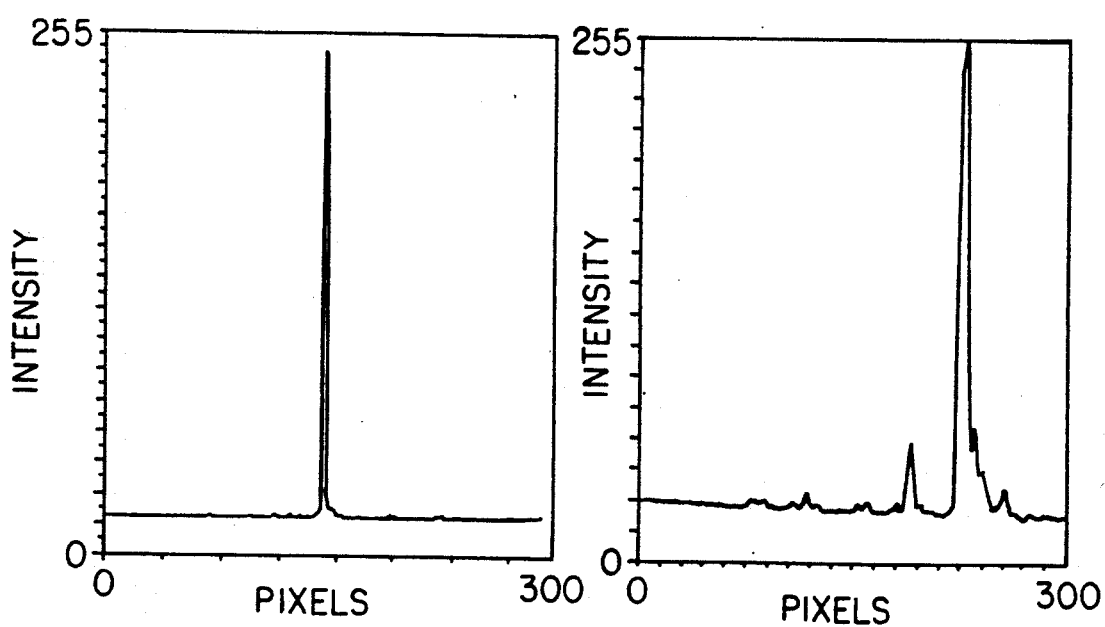
FIG. 12
FIG. 13

OPTICAL ENCODING AND CORRELATION SYSTEM

DEDICATORY CLAUSE

The invention described herein may be manufactured, used, and licensed by or for the Government for governmental purposes without the payment to us of any royalties thereon.

BACKGROUND OF THE INVENTION

This invention relates to a system for encoding a complex optical image onto a coherent laser beam and for utilizing the information encoded in an optical correlator system.

More particularly, this invention relates to a system utilizing one or more liquid crystal television receivers for encoding amplitude and phase components of a complex image onto a coherent laser beam.

It is known to use modified liquid crystal television receivers as a spatial light modulator, as shown in U.S. Pat. No. 4,715,683. This patent describes a VanderLugt architecture correlator using a liquid crystal television receiver as the input spatial light modulator and a holographic film plate as the matched spatial filter. The liquid crystal television receiver is used to encode the input scene onto the laser beam. This encoding is accomplished by selectively blocking portions of the beam so that the image is encoded in amplitude only. A view of an amplitude image encoded in laser light is shown in FIG. 4 of the drawings of this patent. The liquid crystal television receiver, combined with the external polarizers described in this patent blocks the light in the dark regions and passes the light in the bright regions.

Light, however, is a plurality of waves and each has both amplitude and phase. Consider the two waves in FIG. 17 of the appended drawings. The term "amplitude" refers to the height of the crests in the wave. The term "phase" refers to the alignment between the crests in one wave and the crests in the other wave. The eye, film, and video cameras all see intensity, which is a function of the amplitude of the light wave. The liquid crystal television receiver can also modulate phase. This phase modulation can be thought of as a delay in the waves. Suppose the crests of two waves were initially aligned as in FIG. 18. These two waves now pass through different portions, or pixels, of the liquid crystal television receiver. An image can be encoded on the light waves by selectively delaying one wave with respect to the other. If one pixel is "on" and the other pixel is "off", one of the waves will be delayed with respect to the other as shown in FIG. 19. The crests of the light wave are no longer aligned. Most sensors such as the eye cannot see this type of encoding but it can be used in the optical correlators of the invention. This type of encoding is more light efficient because no light is thrown away as in the amplitude only encoding of U.S. Pat. No. 4,715,683. Prior to the invention of the applicants', no one had thought of using the phase modulation property of the liquid crystal television receiver in this manner.

In the past, the liquid crystal television receivers have been useful only after the user has removed low quality polarizers glued to the liquid crystal television receiver and replaced them with high quality external polarizers. The use of such high quality external polarizers results in high costs in both money and light efficiency and has made the use of these polarizers undesirable.

SUMMARY OF THE INVENTION

It has been found that using the phase modulation properties of the liquid crystal television receiver avoids the need for the use of polarizers and results in both lower costs and improved light efficiency in the optical system. Some amplitude modulation is also maintained due to a weak dichroism in the liquid crystal material.

Another advantage of the hybrid modulation property of the liquid crystal material is that it provides analog phase modulation. Before applicants' discovery of this property, only binary phase modulation could be achieved with proper orientation of the polarizer/analyzer combination. analog modulation retains information which is lost in a binary implementation which means better representation of the information in the optical system.

It is an object of the present invention to provide an optical system for encoding a complex optical image onto a coherent laser beam.

It is a further object of the invention to provide an optical correlator system which utilizes a complex optical image wherein the phase component of a complex image is encoded onto the coherent laser beam.

It is a further object of the invention to provide an optical correlator system which utilizes a complex optical image encoded onto a coherent laser beam by using a liquid crystal television receiver for intercepting the path of a coherent laser beam and encoding an amplitude component of the complex image onto the coherent laser beam as it passes through the liquid crystal television receiver.

It is yet another object of the invention to provide an optical correlator system which utilizes a complex optical image encoded onto a coherent laser beam by passing the laser beam through a first liquid crystal television receiver for encoding an amplitude component of the complex image thereon and through second liquid crystal television receiver for encoding a phase component of the complex optical image onto the laser beam.

The above objects, and others which will become apparent, are accomplished by the instant invention which is an optical correlator system utilizing encoded phase and amplitude components of a complex optical image onto coherent laser beam. This is accomplished by passing a coherent laser beam through a first liquid crystal television receiver disposed in its path for encoding a phase component of the complex image thereon. The laser beam may be further passed through a second liquid crystal television receiver disposed within its path in a position spaced from the first liquid crystal television receiver for encoding an amplitude component of the complex optical image onto the coherent laser beam. The laser beam containing only phase or both phase and amplitude components of the complex optical image is then focused onto a focal plane. This focal plane can be a photographic plate or a CCD camera.

BRIEF DESCRIPTION OF THE DRAWING

FIG. 4a is a schematic view of a system for providing an electronic signal to a liquid crystal television of an image to be encoded onto the laser beam;

FIG. 10 is a schematic representation of another embodiment of the system of the invention;

FIG. 12 is a graphic depiction of the pixels in a scan through the correlation signal in the X-direction;

FIG. 13 is a depiction of the pixels in a scan through the correlation signal in the Y-direction;

DETAILED DESCRIPTION OF THE DRAWINGS

Figure 1:
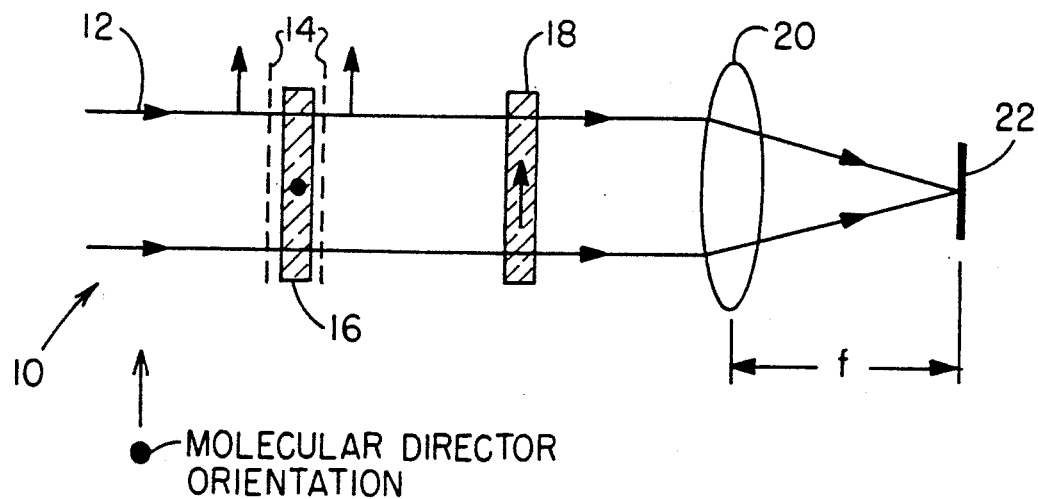
FIG. 1 is a schematic view of an architecture for a complex modulator system having two liquid crystal television receivers.

Referring now to FIG. 1 of the drawings which illustrates an optical system utilizing two liquid crystal television receivers to encode both phase and amplitude information onto a coherent beam of light. The coherent light beam 12 is a laser beam and passes through filters 14 and the first liquid crystal television receiver 16, which encodes the amplitude information of a complex image (not shown) onto beam 12. Each pixel of the liquid crystal television receiver 16 can be independently controlled to encode the desired amplitude distribution. The second liquid crystal television receiver 18 encodes the phase component of the complex image. Each pixel of liquid crystal television receiver 18 is also independently controlled to encode the desired phase distribution. Laser beam 12, after passing through liquid crystal television receivers 16 and 18, passes through a lens 20 which focuses it onto a focal plane 22. Focal plane 22 may be a photographic plate or a CCD camera.

Figure 2:
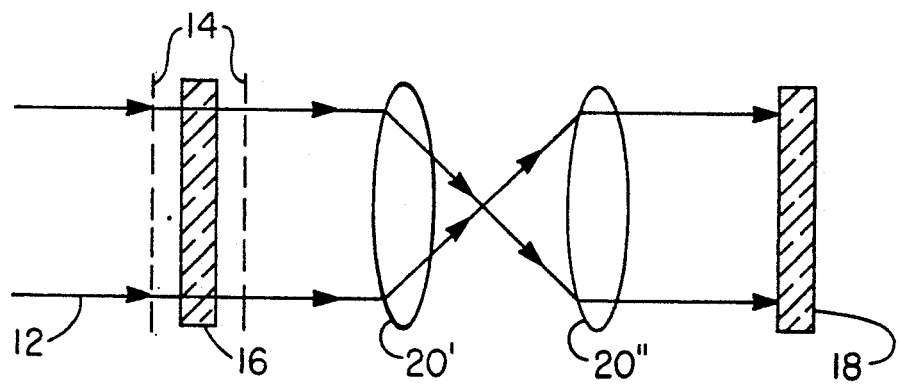
FIG. 2 is a schematic view of an architecture for a complex modulator system for eliminating diffraction effects.

Referring now to FIG. 2 of the drawings, it has been found that the embodiment of the invention illustrated in FIG. 1 is sometimes plagued by diffraction effects from the pixel structure of the amplitude liquid crystal television receiver 16. These effects can be avoided entirely by using the architecture illustrated in FIG. 2. This architecture images the amplitude information onto phase modulator liquid crystal television receiver 18, thereby avoiding the diffraction effects from the amplitude modulator liquid crystal television receiver 16. When phase only modulation is desired, the amplitude modulator liquid crystal television receiver 16 may be eliminated and only the phase modulator liquid crystal television receiver 18 used.

Figure 3:
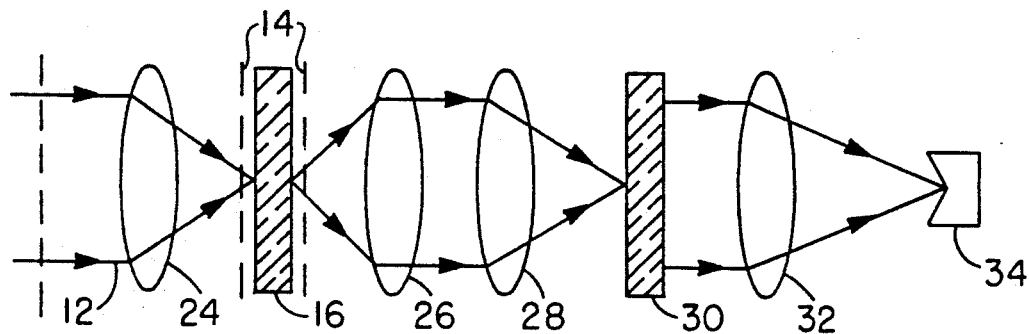
FIG. 3 is a schematic view of a system architecture for using a complex modulator as a filter.

The complex modulator system illustrated in FIG. 3 is useful in the filter plane of an optical system. Most optical systems use real inputs and complex filters. Current spatial light modulators only allow binary, or sometimes ternary, phase filters. In the embodiment of FIG. 3, the laser beam 12 is directed onto the surface of the first liquid crystal television receiver 16 by means of a lens 24. Laser beam 12 also passes through filter 14. Laser beam 12 containing the amplitude component of the complex image is collimated by lenses 26 and 28 and then focused onto a second liquid crystal television receiver 30 wherein the phase component of the complex image is superimposed or encoded onto the laser beam 12. Laser beam 12 containing the encoded amplitude and phase components of the complex image is then focused onto a detector or CCD camera 34 by a lens 32. This architecture provides a full complex filter with independently controllable phase and amplitude components.

Figure 4:
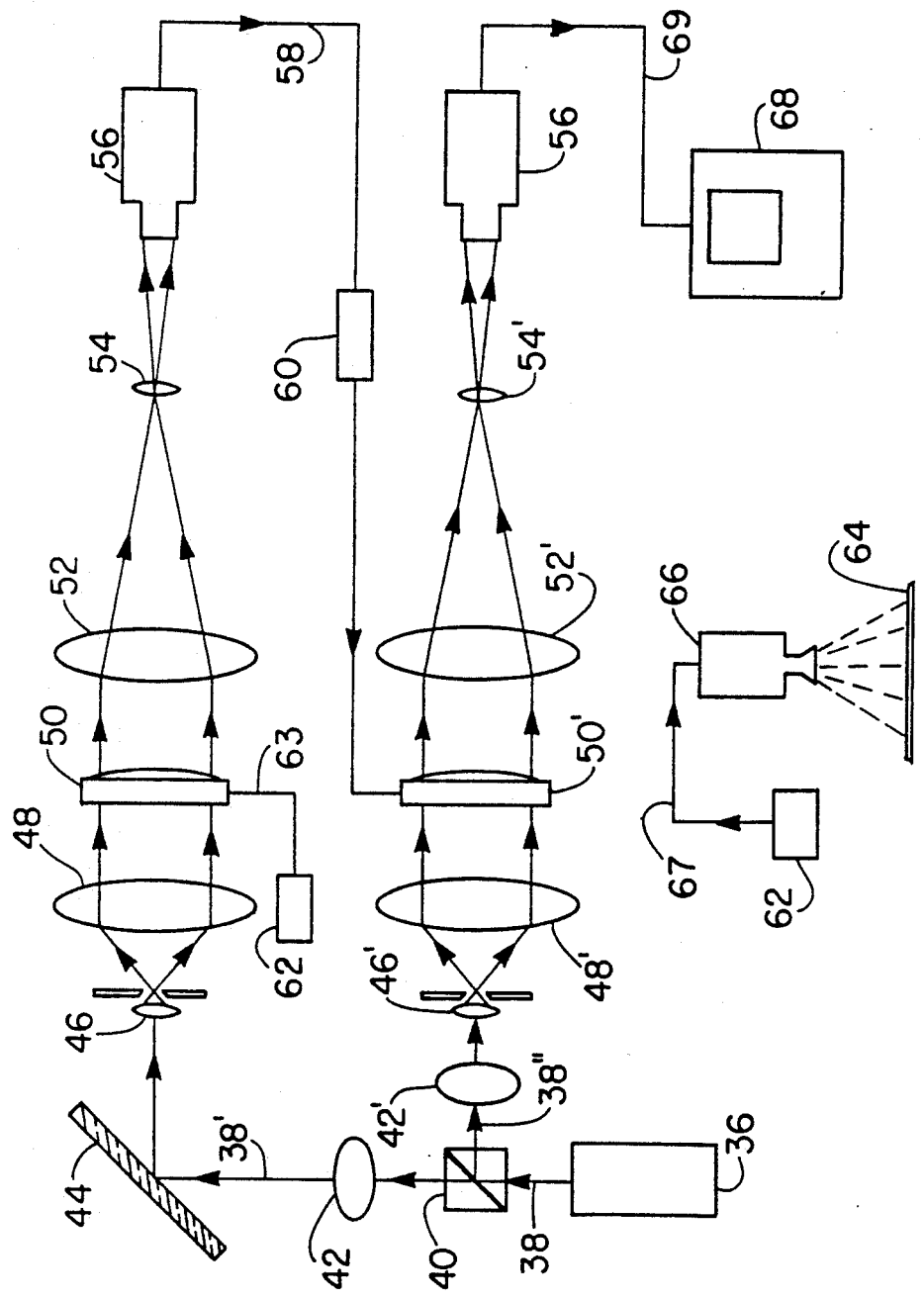
FIG. 4 is a schematic view of an optical correlator system according to the invention.

Referring now to FIG. 4 and 4a of the drawings wherein is illustrated an embodiment of the invention utilizing the liquid crystal television receiver for encoding only the phase components of a complex image onto a laser beam of light. In this embodiment, a laser 36 generates a laser beam 38 which is directed to a beam splitter 40 wherein it is split into two beam components 38' and 38". Beam 38, is directed through a polarizer 42 onto a mirror 44 which changes the direction of beam 38' by 90 degrees. Beam 38' is then directed into a spatial filter and into a biconvex lens 48, which transmits it through a first liquid crystal television receiver 50 wherein a phase component of a complex image of input scene 64 is encoded onto the laser beam 38'. Beam 38', carrying the phase component of the input image 64, is focused by lens 52 onto a microscope objective 54, thence into a charge couple device (CCD) camera 56. Camera 56 converts the image 64 to an electronic signal which is transmitted by cable 58 to a radio frequency modulator 60 and to a second liquid crystal television receiver 50'. At this point, it should be pointed out that the phase component of the input scene or complex image 64 is transmitted through camera 66 and cable 67 to radio frequency modulator 62 and through cable 63 to liquid crystal television receiver 50.

The other beam component 38" is transmitted by the beam splitter 40 through a polarizer 42' and a spatial filter 46', and then through a biconvex lens 48' which directs the beam through liquid crystal television receiver 50'. Here, the phase information imparted by liquid crystal television receiver 50 is again encoded onto the beam 38'. From liquid crystal television receiver 50 the beam goes through lens 52' onto microscope objective 54' and CCD camera 56'. The image received by the CCD camera 56' is then transmitted electronically through cable 69 to a television monitor 68 for correlation purposes.

Figure 5:
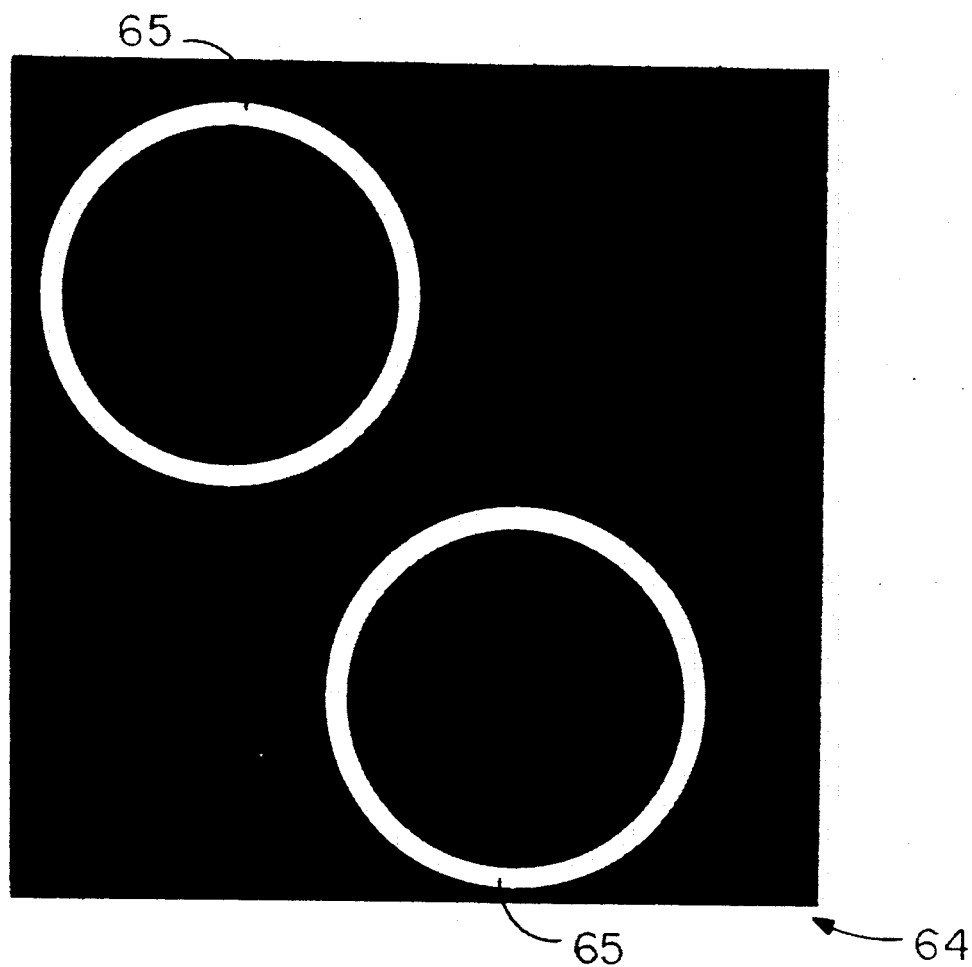
FIG. 5 is a photographic view of a complex image for use in the invention of FIG. 4.

FIG. 5 illustrates a typical input scene or complex image for a joint transformed optical correlator such as that illustrated in FIG. 4 and 4a. This scene contains two hoops 65. One is a reference and the other is transmitted to liquid crystal television receiver 50 as described above.

Figure 6:
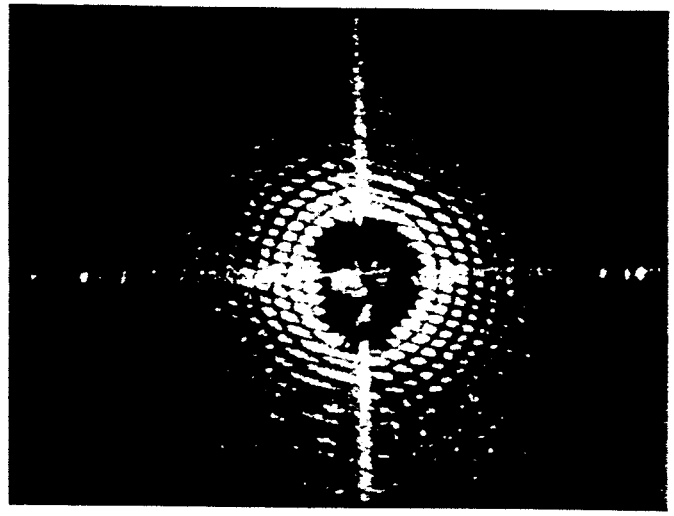
FIG. 6 is a photographic view of the laser beam with the power spectrum generated by the image of FIG. 5, encoded in phase only.

Referring now to FIG. 6 wherein is shown a photographic view of the hoop image, received by CCD camera 56.

Figure 7:
FIG. 7 is a photographic view of the laser beam after it has been compared to a reference signal depicting the recognition signals.

FIG. 7 is a photographic image of the signal received by CCD camera 56'.

Figure 8:
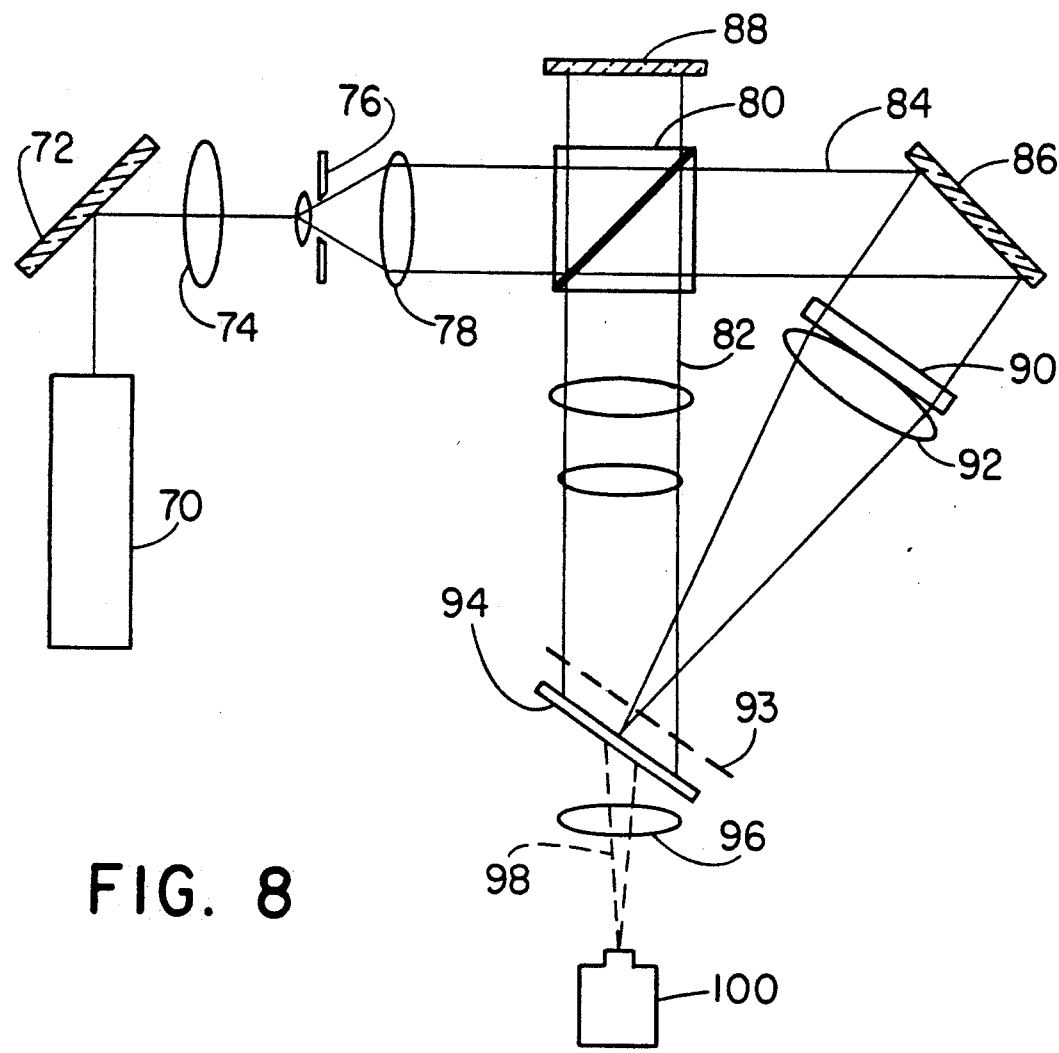
FIG. 8 is a schematic representation of an optical correlator system in accordance with the invention.

FIG. 8 illustrates another embodiment of the invention using a liquid crystal television receiver for encoding phase only information onto the coherent light beam. In this embodiment, laser 70 transmits a coherent laser beam of light onto mirror 72 where its direction is changed by 90° and it is directed through a half wave plate 74 and a spatial filter 76 into lens 78. Lens 78 directs the laser beam into a beam splitter 80 wherein the laser beam is split into two different components 82 and 84. Component 82 is directed into a mirror 88 and back through the beam splitter, through a half wave plate and a polarizer onto a film plate 94. This beam may also pass through an iris 93, but such iris is not a necessary component of the invention. Beam component 84 is directed onto a mirror 86 wherein its direction is changed and directed into a liquid crystal television receiver 90 and focused by lens 92 onto photographic plate 94. After plate 94 is developed, its image may be focused through lens 96 into a beam 98 onto a CCD camera 100 for correlative purposes.

Figure 9:
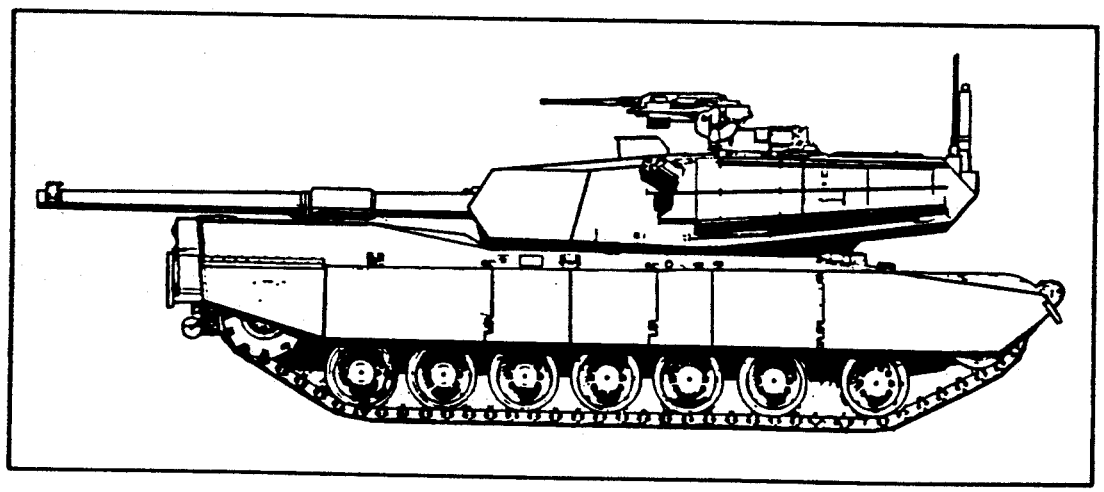
FIG. 9 is a view of the image imposed onto said laser beam.

Referring now to FIG. 9 wherein is illustrated a typical complex image for correlation purposes. This image is transmitted to liquid crystal television receiver 90 in the same manner as described above with regard to FIG. 4.

Referring now to FIG. 10, wherein the embodiment of the invention illustrated in FIG. 8 is modified to replace film plate 94 with a second liquid crystal television receiver 104 functioning as a filter. The filtered optical beam is focused onto a CCD camera 100 by lens 106.

Figure 11:
FIG. 11 is a photographic view of the correlation signal taken from the embodiment of the invention in FIG. 8.

FIG. 11 illustrates the correlation signal from the embodiment of the invention illustrated in FIG. 4.

FIG. 12 is a graph illustrating the correlation signal in the X-direction.

FIG. 13 illustrates the correlation signal in the Y-direction.

Figure 14:
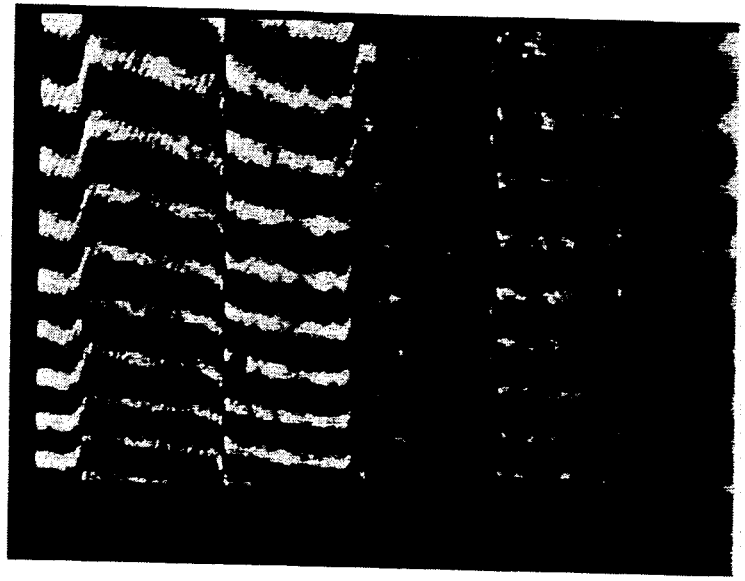
FIG. 14 is a photographic view of the fringes from an interferometer with a liquid crystal television displaying a bar pattern.

FIG. 14 is an illustration of the fringes from an interferometer with the liquid crystal television receiver, displaying a bar pattern.

Figure 15:
FIG. 15 is a photographic view of the bar pattern encoded onto the laser beam by a liquid crystal television receiver having no analyzer.

FIG. 15 illustrates the bar pattern as encoded by the liquid crystal television receiver with no analyzer.

Figure 16:
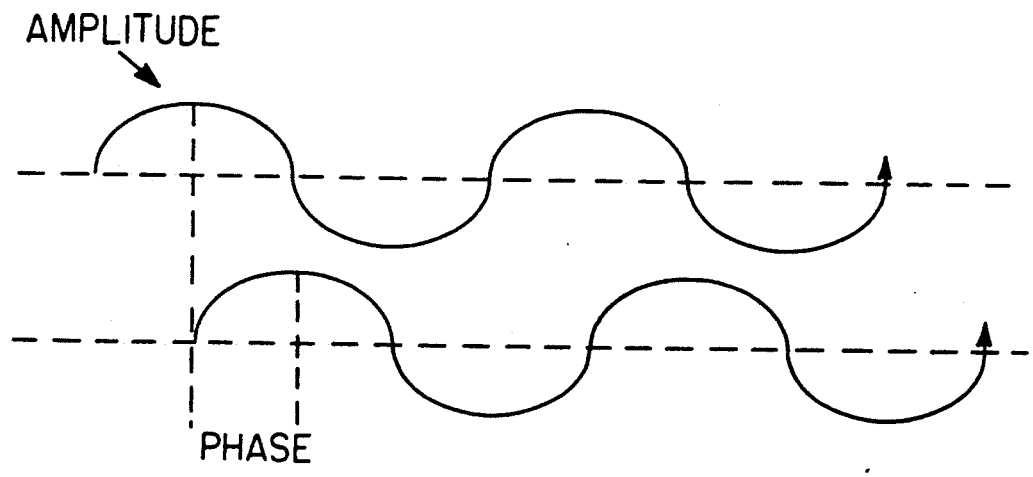
FIG. 16 is a photographic view of an image to be encoded onto a laser beam.

FIG. 16 shows a complex image to be encoded onto a laser beam.

Figure 17:
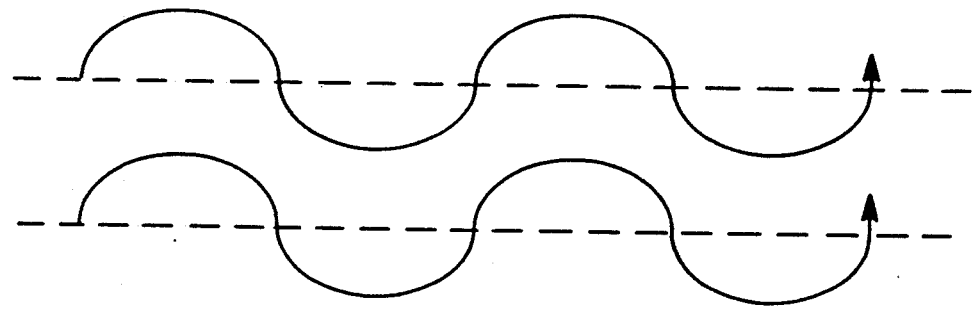
FIG. 17 is a schematic view of light waves, showing both phase and amplitude characteristics.

FIG. 17 shows two light waves and illustrates their phase and amplitude characteristics.

Figure 18:
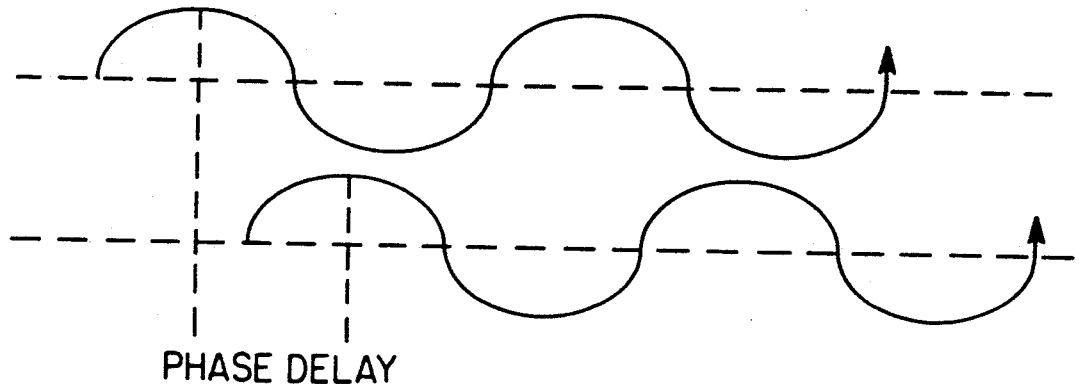
FIG. 18 is a view similar to FIG. 17, showing two light waves passing through two different portions or pixels of a liquid crystal television.

FIG. 18 shows two light waves in phase, before they pass through two different portions or pixels of a liquid crystal television.

Figure 19:
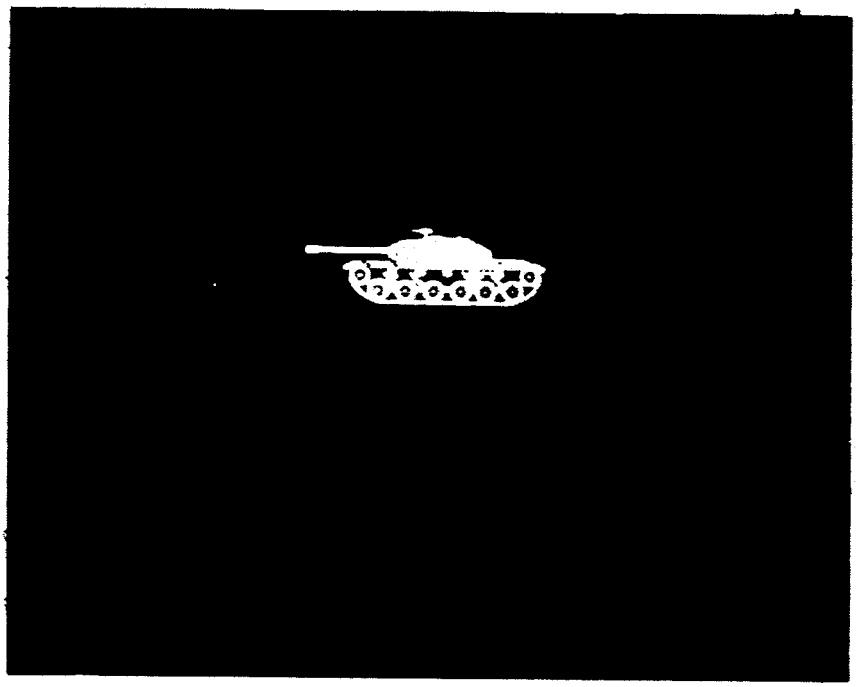
FIG. 19 is a view similar to FIG. 17, showing two light waves passing through "on" and "off" pixels to illustrate the phase delay induced by passing a coherent light beam through a liquid crystal television receiver.

FIG. 19 is a view similar to FIG. 18 showing two light waves after they have passed through an liquid crystal television receiver, through "on" and "off" pixels, to show the phase delay induced by the liquid crystal television receiver.

Hereinabove, applicants have described several embodiments of their invention. One major embodiment utilizes two liquid crystal television receivers for encoding both amplitude and phase components of a complex image onto a coherent laser beam. Another embodiment utilizes one or more liquid crystal television receivers for encoding phase only information onto a coherent laser beam for modulation purposes. It will be understood that many modifications may be made in the structures and architectures illustrated herein without departing from the scope of applicants' invention as set forth in the appended claims.

We claim:

1. An optical correlator system for encoding a complex optical image having both phase and amplitude components onto a coherent laser beam and comparing it with a reference complex image having both phase and amplitude components, comprising:
   a) a first liquid crystal television receiver (LCTV) disposed within a predetermined path;
   b) a second liquid crystal television receiver (LCTV) disposed within said predetermined path in a position spaced from said first LCTV;
   c) means for directing said coherent laser beam through said first and second LCTV receivers along said predetermined path;
   d) lens means spaced from said second LCTV receiver in said path for receiving said coherent beam and for focusing it onto a focal plane;
   e) means to transmit an amplitude component of said complex image to said first LCTV;
   f) means to transmit a phase component of said complex image to said second LCTV;
   g) means to control said first LCTV to encode said amplitude component onto said laser beam as said laser beam passes through said first LCTV; and
   h) means to control said second LCTV to encode said phase component onto said laser beam as said laser beam passes through said second LCTV, whereby said laser beam with both amplitude and phase components encoded thereon are focused onto said focal plane.

2. A system as set forth in claim 1, further comprising a detector within said predetermined path.

3. A system as set forth in claim 2, wherein said detector is a CCD camera.

4. A system as set forth in claim 1, further comprising a beam splitter disposed in said predetermined path for splitting said coherent beam of light into two separate light beams one of which passes through said LCTV and the other of which is directed through a second LCTV disposed along a second predetermined path.

5. A system as set forth in claim 4, wherein the image detected by said detection means in said predetermined path is transmitted to said second LCTV by transmitter means where it is encoded onto said second light beam in said second path.

6. A system as set forth in claim 1, further comprising detector means disposed within said second path for detecting said laser beam and for transmitting the beam detected to a television monitor.

* * * * *